United States Patent [19]

Takahashi et al.

[11] 4,303,560
[45] Dec. 1, 1981

[54] RUBBERY POLYMER COMPOSITION

[75] Inventors: Kohki Takahashi; Takeo Kondoh, both of Sagamihara; Masao Koga, Machida; Kenichiro Nishiwaki, Ichihara, all of Japan

[73] Assignee: Denki Kagaku Kogyo Kabushiki Kaisha, Tokyo, Japan

[21] Appl. No.: 94,951

[22] Filed: Nov. 16, 1979

[30] Foreign Application Priority Data

Mar. 17, 1979 [JP] Japan .................................. 54/31590
Mar. 17, 1979 [JP] Japan .................................. 54/31591

[51] Int. Cl.$^3$ .................... C08F 8/00; C08F 210/02; C08L 23/00
[52] U.S. Cl. ................... 260/4 R; 260/42.52; 260/45.7 P; 260/45.75 N; 260/45.8 N; 260/45.85 R; 260/45.9 R; 260/45.95 R; 525/208; 525/223; 525/345; 525/347; 525/351; 525/354; 525/378; 525/382; 525/387; 526/273; 526/292.1; 526/320; 526/292.6
[58] Field of Search ............... 526/273, 292, 320, 329, 526/329.5; 260/4 R, 42.52, 45.7 P, 45.75 N, 45.8 N, 45.85, 45.9 R, 45.95; 525/345, 347, 351, 354, 359, 378, 382, 386, 387, 208, 223

[56] References Cited

U.S. PATENT DOCUMENTS

| | | | |
|---|---|---|---|
| 2,440,092 | 4/1948 | Hyman et al. | 526/320 |
| 2,565,259 | 8/1951 | Nyquist | 526/320 |
| 3,450,681 | 6/1969 | Gobran et al. | 526/320 |
| 3,488,311 | 1/1970 | Jorgensen | 260/23 |
| 3,493,548 | 2/1970 | Chalmers | 526/273 |
| 3,779,992 | 12/1973 | Liu et al. | 526/329 |
| 3,957,711 | 5/1976 | Powanda et al. | 526/329.5 |
| 4,073,779 | 2/1978 | Wiest et al. | 526/329 |

FOREIGN PATENT DOCUMENTS 1175545 12/1969 United Kingdom .

*Primary Examiner*—Harry Wong, Jr.
*Attorney, Agent, or Firm*—Oblon, Fisher, Spivak, McClelland & Maier

[57] ABSTRACT

A rubbery polymer composition comprises a cross-linked copolymer comprising the following components.

Type I 15 to 40 wt. parts of a vinyl carboxylate having the formula (I); 60 to 85 wt. parts of an alkoxyalkyl acrylate having the formula (II); 0 to 15 wt. parts of ethylene; (100 wt. parts of a total of said three components); 0 to 5 wt. parts of the components having the formula (III), (IV) or (V):

Type II 15 to 55 wt. parts of a vinyl carboxylate having the formula (I); 5 to 20 wt. parts of ethylene; an alkyl acrylate having the formula (II'); an alkoxyalkyl acrylate having the formula (II) (100 wt. parts of a total of said four components and more than 0.8 of a ratio of the alkoxyalkyl acrylate (II) to the alkyl acrylate (II') by weight); 0 to 5 wt. parts of the components having the formula (III), (IV) or (V):

(I): RCOO—CH=CH$_2$
wherein R represents a C$_{1-4}$ alkyl group.
(II): CH$_2$=CHCOO—R$_1$—O—R$_2$
wherein R$_1$ represents a C$_{1-4}$ alkylene group; and R$_2$ represents a C$_{1-4}$ alkyl or alkoxyalkyl group.
(II'): CH$_2$=CHCOO—R$_6$
wherein R$_6$ represents a C$_{3-8}$ alkyl group.

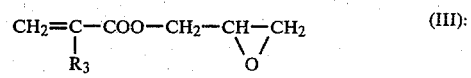

(III)

wherein R$_3$ represents hydrogen atom or methyl group.

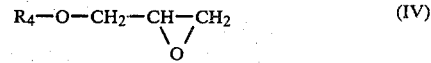

(IV)

wherein R$_4$ represents vinyl, allyl or methallyl group.
(V): CH$_2$=CH—O—R$_5$
wherein R$_5$ represents CH$_2$Cl—CH$_2$— or CH$_2$Cl—CO— group.

8 Claims, No Drawings

RUBBERY POLYMER COMPOSITION

BACKGROUND OF THE INVENTION

1. Field of the Invention

The present invention relates to a rubbery polymer composition having excellent mechanical characteristics and durabilities such as heat resistance, oil resistance and weathering property, which is obtained by crosslinking a copolymer of a vinyl carboxylate and an alkoxyalkyl acrylate as main components.

2. Description of the Prior Arts

High mechanical properties such as tensile strength and elongation and high durabilities such as heat resistance, oil resistance and weathering property have been required for rubber parts such as parts for cars and other machines. Recently, the demand for durabilities has been increased.

Heretofore, chloroprene rubber or nitrile rubber has been usually used for rubber parts which should have oil resistance. However, the demand for heat resistance and weathering property (ozone resistance) has been further increased. Thus, acryl rubber or epichlorohydrin rubber which has said properties, has been used. The acryl rubber has disadvantages that it is highly swellable in a fuel oil and accordingly, it can not be used as parts which should have high fuel oil resistance. On the other hand, epichlorohydrin rubber has disadvantages that it has low flexural resistance and it is softened by heating. A rubber having excellent mechanical properties and durabilities has not been found.

The inventors have studied on various kinds of rubber having balanced mechanical properties and durabilities.

SUMMARY OF THE INVENTION

It is an object of the present invention to provide a rubbery polymer composition which has excellent durabilities such as heat resistance, oil resistance (fuel oil resistance) and weathering property as well as excellent mechanical properties.

The foregoing and other objects of the present invention have been attained by providing a rubbery polymer composition which is obtained by crosslinking a copolymer comprising the following components.

Type I 15 to 40 wt.parts of a vinyl carboxylate having the formula (I); 60 to 85 wt.parts of an alkoxyalkyl acrylate having the formula (II); 0 to 15 wt.parts of ethylene; (100 wt.parts of a total of said three components); 0 to 5 wt.parts of the components having the formula (III), (IV) or (V):

Type II 15 to 55 wt.parts of a vinyl carboxylate having the formula (I); 5 to 20 wt.parts of ethylene; an alkyl acrylate having the formula (II'); an alkoxyalkyl acrylate having the formula (II) (100 wt.parts of a total of said four components and more than 0.8 of a ratio of the alkoxyalkyl acrylate (II) to the alkyl acrylate (II') by weight); 0 to 5 wt.parts of the components having the formula (III), (IV) or (V):

(I): $RCOO-CH=CH_2$ wherein R represents a $C_{1-4}$ alkyl group.

(II): $CH_2=CHCOO-R_1-O-R_2$ wherein $R_1$ represents a $C_{1-4}$ alkylene group; and $R_2$ represents a $C_{1-4}$ alkyl or alkoxyalkyl group.

(II'): $CH_2=CHCOO-R_6$ wherein $R_6$ represents a $C_{3-8}$ alkyl group.

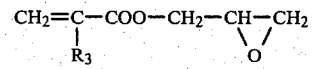

wherein $R_3$ represents hydrogen atom or methyl group.

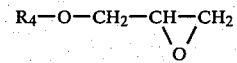

wherein $R_4$ represents vinyl, allyl or methallyl group.

(V): $CH_2=CH-O-R_5$ wherein $R_5$ represents $CH_2Cl-CH_2-$ or $CH_2Cl-CO-$ group.

DETAILED DESCRIPTION OF THE PREFERRED EMBODIMENTS

The vinyl carboxylates have the formula $$R-COOCH=CH_2 \qquad (I)$$

wherein R represents a $C_{1-4}$ alkyl group.

Suitable vinyl carboxylates include vinyl acetate, vinyl propionate and vinyl butyrate. When vinyl caproate (R is a $C_5$ alkyl group) is used, the satisfactory oil resistance can not be given.

The alkoxyalkyl acrylates have the formula $$CH_2=CHCOOR_1-O-R_2 \qquad (II)$$

wherein $R_1$ represents a $C_{1-4}$ alkylene group and $R_2$ represents $C_{1-4}$ alkyl or alkoxy group.

Suitable alkoxyalkyl acrylates include methoxyethyl acrylate, methoxymethyl acrylate, ethoxyethyl acrylate, butoxyethyl acrylate, methoxyethoxyethyl acrylate and ethoxyethoxyethyl acrylate.

The alkyl acrylates have the formula $$CH_2=CHCOO-R_6 \qquad (II')$$

wherein $R_6$ represents a $C_{3-8}$ alkyl group.

Suitable alkyl acrylates include n-butyl acrylate, n-hexyl acrylate, n-octyl acrylate and 2-ethylhexyl acrylate.

In Type I, the copolymer comprises the components of 15 to 40 wt.parts of a vinyl carboxylate (I), 60 to 85 wt.parts of an alkoxyalkyl acrylate (II) and 0 to 15 wt.parts of ethylene as 100 wt.parts of a total of said three components.

When the content of the vinyl carboxylate is less than 15 wt.parts, the mechanical properties of the composition are inferior and unsatisfactory whereas when it is more than 40 wt.parts, the cold resistance of the composition is unsatisfactory.

In the specification, the cold resistance means a low temperature property.

When the content of the alkoxyalkyl acrylate is less than 60 wt.parts, the oil resistance of the composition is unsatisfactory, whereas when it is more than 85 wt.parts, the mechanical properties of the composition are inferior and unsatisfactory.

Ethylene is not always incorporated. In order to improve the cold resistance of the composition, ethylene can be incorporated at a ratio of less than 15 wt.parts. When the content of ethylene is more than 15 wt.parts, the fuel oil resistance of the composition is unsatisfactory. The content of ethylene is preferably less than 10 wt.parts.

In Type II, the copolymer comprises the components of 15 to 55 wt.parts of a vinyl carboxylate (I) 5 to 20 wt.parts of ethylene and an alkyl acrylate (II') and an alkoxyalkyl acrylate (II) as 100 wt.parts of a total of said four components and more than 0.8 of a ratio of the alkoxyalkyl acrylate (II) to the alkyl acrylate (II') by weight.

When the content of the vinyl carboxylate (I) is less than 15 wt.parts, the mechanical properties of the composition are inferior and unsatisfactory whereas when it is more than 55 wt.parts, the cold resistance of the composition is unsatisfactory.

When the content of ethylene is less than 5 wt.parts, the cold resistance of the composition is unsatisfactory whereas when it is more than 20 wt.parts, the oil resistance of the composition is unsatisfactory. The content of ethylene is preferably in a range of 5 to 15 wt.parts.

The ratio of the alkoxyalkyl acrylate (II) to the alkyl acrylate (II') by weight is more than 0.8. When it is less than 0.8, the oil resistance is unsatisfactory.

The alkyl acrylate (II') is incorporated in the copolymer in order to give superior cold resistance of the composition in comparison with that of the incorporation of only alkoxyalkyl acrylate, at a ratio for giving satisfactory oil resistance of the composition. The content of the alkyl acrylate (II') is preferably in a range of 10 to 35 wt.parts especially 15 to 35 wt.parts.

The alkoxyalkyl acrylate is incorporated in the copolymer in order to give superior oil resistance. The content of the alkoxyalkyl acrylate is usually in said range and preferably in a range of 15 to 65 wt.parts.

In both of Type I and Type II, 0 to 5 wt.parts of the components having the formula (III), (IV) or (V) are incorporated.

Suitable compounds having the formula (III) include glycidyl acrylate and glycidyl methacrylate.

Suitable compounds having the formula (IV) include vinylglycidyl ether, allylglycidyl ether and methallylglycidyl ether.

Suitable compounds having the formula (V) include vinyl chloroacetate and 2-chloroethyl vinyl ether.

The compounds (III), (IV), (V) provide crosslinking points in the composition of the present invention so that the crosslinking of the composition can be performed with a polyfunctional compound such as polyamine beside peroxides. The crosslinking can be performed in hot air. However, when the content of the compounds (III), (IV), (V) is excess, the crosslinked degree is too high to attain satisfactory mechanical strength. Thus, the content of the compounds (III), (IV), (V) is usually in a range of 0 to 5 wt.parts preferably 0.3 to 3 wt.parts. When it is more than 5 wt.parts, the crosslinked degree is too high to attain satisfactory mechanical strength.

The copolymer used in the present invention can be produced by a copolymerization of the monomers at substantially same ratios for the components in the compositions by an emulsion polymerization, a bulk polymerization, a solution polymerization, etc. It is preferable to produce it by the emulsion polymerization.

In order to produce the copolymer having ethylene component, the polymerization can be carried out in an atmosphere of ethylene under a pressure. The polymerization is usually carried out by a method similar to the conventional copolymerization of ethylene-vinyl acetate. The detail description of the method of the polymerization is eliminated.

The copolymer has 35 to 50 of Mooney viscosity ($ML_{1+4}$) at 100° C. measured by Mooney viscometer (manufactured by Toyo Seiki K.K.).

The crosslinking is carried out by incorporating 0.3 to 10 wt.% preferably 0.5 to 5 wt.% of a crosslinking agent based on the copolymer, into the copolymer. When the content of the crosslinking agent is less than 0.3 wt.%, the crosslinking is not satisfactory whereas when it is more than 10 wt.%, excess of crosslinking is caused or scorch is caused.

Suitable crosslinking agents include peroxides such as benzoylperoxide, 2,4-dichlorobenzoylperoxide, 1,1-di-(t-butylperoxy)-3,3,5-trimethylcyclohexane, n-butyl-4,4-bis(t-butylperoxy)valerate, dicumylperoxide, di-t-butylperoxy-diisopropylbenzene 2,5-dimethyl-2,5-di-(t-butylperoxy)hexane, 2,5-dimethyl-2,5-di-(t-butylperoxy)hexine-3, etc.

An expoxide ring cleavage agent can be used as a crosslinking agent for a copolymer having any component derived from the compound (III), (IV), (V).

Suitable epoxide ring cleavage agents include polyamines such as tetraethylenepentamine, hexaethylenetetramine, hexamethylenediaminecarbamate, N,N'-dicinnamylidene-1,6-hexanediamine and thermally decomposable ammonium salts such as ammonium benzoate, ammonium citrate ammonium tartarate. The crosslinking agent can be combined with a dithiocarbamate (metal salts), a thiuram or sulfur etc.

In order to impart practically advantageous properties as rubber products, it is preferable to incorporate a reinforcing agent such as carbon black, silicic acid anhydride, silicic acid hydrate, hard clay, surface treated calcium carbonate and micro talc at a ratio of 10 to 200 wt.parts especially 30 to 100 wt.parts per 100 wt.parts of the copolymer together with the crosslinking agent in the rubbery polymer composition.

In order to modify processability and other properties, it is possible to incorporate a lubricant such as stearic acid and its metal salt; a filler such as soft clay, precipitated calcium carbonate, crushed calcium carbonate and talc; a petroleum type softener; a plasticizer such as synthetic polyester, polyoxyethylene ester or ether type plasticizer; and an antioxidant.

When the copolymerization is carried out by forming crosslinking points with the compound (V), a stearic acid salt imparts a function as a crosslinking agent. Thus, the combination should be carefully considered.

The antioxidant can be most of antioxidants used for stabilizing polymers.

Suitable antioxidants include amine type antioxidants such as N-phenyl-N'-isopropyl-p-phenylenediamine, phenyl-α-naphthylamine, acrylic acid esters having aromatic amine component, (NOCRAC G-1 manufactured by Ouchi Shinko Kagaku K.K.) trimethyldihydroquinoline polycondensed product; phenol type antioxidants such as 3,5-di-t-butyl-4-hydroxytoluene, 1,3,5-trimethyl-2,4,6-tris(3,5-di-t-butyl-4-hydroxybenzyl)benzene, octadecyl-3-(3,5-di-t-butyl-4-hydroxyphenyl)propionate, 4,4'-thiobis(6-t-butyl-3-methylphenol); dithioic acid type antioxidants such as nickel dibutyldithiocarbamate and dilauryldithiopropionate; phosphoric acid ester type antioxidants such as tris(nonylphenyl)-phosphite etc.

One or more of the antioxidant can be incorporated.

In order to incorporate various additives into the composition of the copolymer, the conventional kneading methods used in the rubber industry can be used. It is possible, if necessary, to use a wet master batch method wherein carbon black and other additives are incorporated into a slurry of the copolymer obtained by the polymerization for producing the copolymer, and the mixture is dried.

The rubbery polymer composition of the present invention can be obtained by crosslinking the mixture obtained by kneading the copolymer, the additives and the crosslinking agent by a desired conventional vulcanization used in the rubber industry.

The condition of crosslinking i.e. vulcanization is depending upon a kind and amount of the crosslinking agnet and the crosslinking is usually performed at 120° to 200° C. for about 2 to 200 minutes.

The copolymer can be crosslinked at various crosslinking velocity depending upon the kind of the crosslinking agent. It is possible to incorporate sulfur together with the crosslinking agent.

Thus, in order to prepare the rubbery polymer composition of the present invention by the crosslinking, it is possible to blend the copolymer to the other rubbery polymer such as EPDM, NBR, chloroprene rubber, natural rubber, styrene-butadiene rubber, butadiene rubber, butyl rubber and isoprene rubber, whereby the oil resistance and the weathering property of the composition can be improved while the mechanical properties of the rubbery polymer are maintained in suitable levels.

The resulting rubbery polymer compositions of the present invention is molded before or during the crosslinking by a desired rubber molding method to obtain rubber parts suitable for usages requiring high oil resistance, heat resistance and weathering property together with the mechanical properties such as rubber parts for car especially rubber parts requiring high fuel oil resistance such as a fuel oil horse and industrial parts used in contacting with a hot lubricant oil.

The present invention will be further illustrated by certain examples and references which are provided for purposes of illustration only and are not intended to be limiting the present invention.

In the examples and references, the structures of the copolymer were measured by the following analysis of the components.

A solution of a copolymer is prepared and an aqueous solution of sodium hydroxide is added to the solution whereby a hydrolysis of the copolymer is carried out. After the hydrolysis, the content of —COONa in the solution is measured by a potentiometric titration. The free carboxylic acid the alcohol and the alkoxyalcohol in the solution are completely separated from the hydrolyzed copolymer. The free carboxylic acid is measured by a titration. The alcohol is measured by a gas chromatography. The contents of the vinyl carboxylate, the alkyl acrylate and the alkoxyalkyl acrylate are calculated. When the component of the compound (III), (IV), (V) is included, the components (III), (IV) are measured by a quantitative analysis of epoxy group, and the compound (V) is measured by a quantitative analysis of chlorine atom. The content of ethylene component is calculated by subtracting the contents of these components from the total weight of the copolymer.

EXAMPLE 1

In a 40 liter autoclave, 16.2 kg. of an aqueous solution containing 530 g. of polyvinyl alcohol (hereinafter referring to as PVA) and 21.6 g. of sodium acetate was charged and then, 2.16 kg. of vinyl acetate and 8.64 kg. of 2-methoxyethyl acrylate were added with stirring to emulsify the mixture. The autoclave was purged with nitrogen gas and ethylene monomer was fed from the top under a pressure. The partial pressure of ethylene was adjusted to 55 kg./cm$^2$ at a polymerization temperature of 65° C.

Then, 1% aqueous solution of ammonium persulfate was added for several times to stop the polymerization for about 10 hours. The residual monomer was removed, and the resulting emulsion of copolymer was coagulated with 3% aqueous solution of borax and the product was separated, dehydrated and dried on rolls to obtain the copolymer. The yield of the copolymer was 10.4 kg. and the copolymer had a structure comprising 18 wt.parts of vinyl acetate component, 76 wt.parts of 2-methoxyethyl acrylate component and 6 wt.parts of ethylene component.

The copolymer was admixed with the following additives and the mixture was kneaded by 8 inch rolls at 40° C. and then, press-vulcanized at 160° C. for 30 minutes to prepare a vulcanized sheet having 15 cm × 15 cm and a thickness of 2 mm. Physical properties of the sample were measured. The results are shown in Table 1.

| Copolymer | 100 wt. parts |
| Antioxidant (NOCRAC 224: Ouchishinko Kagaku) | 1 wt. parts |
| Stearic acid | 1 wt. parts |
| Carbon SRF-LM | 60 wt. parts |
| Dicumyl peroxide | 1.5 wt. parts |
| Triallylcyanurate | 2 wt. parts |

REFERENCE 1

In accordance with the process of Example 1 except using epichlorohydrin rubber (Hydrin 200 manufactured by Goodrich Co. Ltd.) the following components were mixed, kneaded and vulcanized and physical properties of the sample were measured. The results are shown in Table 1.

| Epichlorohydrin rubber | 100 wt. parts |
| Antioxidant (NOCRAC 224) | 1 wt. parts |
| Stearic acid | 1 wt. parts |
| Carbon SRF-LS | 60 wt. parts |
| Red lead | 5 wt. parts |
| Vulcanization accelerator (NOCCELER-22 manufactured by Sanshin Kagaku Co. Ltd. | 1.5 wt. parts |

REFERENCE 2

In accordance with the process of Example 1 except using acryl rubber (AR-31 manufactured by Nippon Zeon Co., Ltd.), the following components were mixed, kneaded and vulcanized and physical properties of the sample were measured. The results are shown in Table 1.

| Acryl rubber | 100 wt. parts |
| Antioxidant (NOCRAC 224) | 1 wt. parts |
| Stearic acid | 1 wt. parts |
| Carbon SRF-LM | 60 wt. parts |

-continued

| | |
|---|---|
| Ammonium benzoate | 1 wt. parts |

TABLE 1

| | Example 1 | Reference 1 | Reference 2 |
|---|---|---|---|
| Physical property[*1] | | | |
| $T_B$ (kg./cm$^2$) | 107 | 145 | 118 |
| $E_B$ (%) | 230 | 300 | 250 |
| Hs | 56 | 67 | 62 |
| Heat resistance-1[*2] | | | |
| $A_R(T_B)$ (%) | 108 | 87 | 93 |
| $A_R(E_B)$ (%) | 67 | 67 | 66 |
| ΔHs | +6 | −2 | +7 |
| Heat resistance-2[*3] | | | |
| $A_R(T_B)$ (%) | 102 | 40 | 95 |
| $A_R(E_B)$ (%) | 68 | 87 | 64 |
| ΔHs | +7 | −18 | +7 |
| Oil resistance[*4] | | | |
| ΔV, (%) | 41 | 39 | 77 |

Note:
[*1] Japanese Industrial Standard K 6301
$T_B$: tensile strength
$E_B$: elongation
Hs: hardness measured by spring type hardness tester (Japanese Industrial Standard)
[*2] Japanese Industrial Standard K 6301 6.3: (measured after heat-ageing at 150° C. for 96 hours)
$A_R(T_B)$: residual percent of $T_B$ after heat-ageing to $T_B$ before heat-ageing (%)
$A_R(E_B)$: residual percent of $E_B$ after heat-ageing to $E_B$ before heat-ageing (%)
ΔHs: difference between Hs before heat-ageing and Hs after heat-ageing
[*3] Japanese Industrial Standard K 6301 6.3: (measured after ageing at 150° C. for 192 hours) The definitions of $A_R(T_B)$, $A_R(E_B)$ and ΔHs are defined above.
[*4] Japanese Industrial Standard K 6301
ΔV: volume increase percent after dipping into a fuel oil-C at 20° C. for 48 hours (%)
These definitions are also applied for the data in the following tables.

EXAMPLES 2 to 4; REFERENCE 3

In a 40 liter autoclave, 16.2 kg. of each aqueous solution containing 530 g. of PVA, 21.6 g. of sodium acetate, 34.2 g. of Rongalit, 1.08 g. of ethylenediaminetetraacetic acid and 0.54 g. of ferrous sulfate was charged and 2.16 kg. of each vinyl carboxylate was added to it with stirring to emulsify the mixture. The autoclave was purged with nitrogen gas and heated at 45° C. and a mixture of 8.64 kg. of 2-methoxyethyl acrylate and 162 g. of glycidyl methacrylate and 1% aqueous solution of ammonium persulfate were respectively fed dropwise from different inlets, during 8 to 16 hours and the polymerization was performed. After the polymerization, the residual monomer was removed and the resulting emulsion of copolymer was coagulated with an aqueous solution of borax and the product was separated, dehydrated and dried on rolls to obtain the copolymer. The structures and yields of the copolymers are shown in Table 2.

Each copolymer was admixed with the following additives and the mixture was kneaded by 8 inch rolls at 50° C. and then, pressvulcanized at 160° C. for 30 minutes to prepare a vulcanized sheet having 15 cm × 15 cm and a thickness of 2 mm. Physical properties of each sample were measured. The results are shown in Table 2.

| | |
|---|---|
| Copolymer | 100 wt. parts |
| Antioxidant (NOCRAC 224) | 1 wt. parts |
| Stearic acid | 1 wt. parts |
| Carbon HAF | 40 wt. parts |
| Tetraethylenepentamine | 1 wt. parts |

TABLE 2

| Vinyl carboxylate | Exp. 2 vinyl acetate | Exp. 3 vinyl propionate | Exp. 4 vinyl butyrate | Ref. 3 vinyl caproate |
|---|---|---|---|---|
| Structure (wt. parts) | | | | |
| vinyl carboxylate comp. | 19 | 21 | 17 | 22 |
| 2-methoxyethyl acrylate comp. | 81 | 79 | 83 | 78 |
| glycidyl methacrylate comp. | 1.0 | 0.9 | 1.1 | 1.0 |
| Yield (kg.) | 10.5 | 10.6 | 10.1 | 10.2 |
| Physical property | | | | |
| $T_B$ (kg/cm$^2$) | 145 | 111 | 83 | 85 |
| $E_B$ (%) | 170 | 170 | 190 | 130 |
| Hs | 66 | 64 | 57 | 58 |
| Heat resistance-1 | | | | |
| $A_R(T_B)$ (%) | 104 | 100 | 121 | 100 |
| $A_R(E_B)$ (%) | 71 | 77 | 69 | 81 |
| ΔHs | +9 | +7 | +12 | +7 |
| Oil resistance | | | | |
| ΔV (%) | 30 | 35 | 43 | 66 |
| Cold resistance[*5] | | | | |
| $T_b$ (°C.) | −23 | −33 | −36 | −39 |
| Ozone resistance[*6] | no crack | no crack | no crack | no crack |

Note:
[*5]: Japanese Industrial Standard K 6301 14
$T_b$: brittle point temperature
[*6]: A formation of cracking of a sample is observed after storing a sample treated by stretching 20% in an atmosphere containing 100 ppm of ozone at 40° C.
These definitions are also applied for the data in the following table.

EXAMPLES 5 to 8; REFERENCES 4 to 6

In a 40 liter autoclave, 16.2 kg. of each aqueous solution containing 530 g. of PVA, 21.6 g. of sodium acetate, 32.4 g. of Rongalit, 1.08 g. of ethylenediaminetetraacetic acid and 0.54 g. of ferrous sulfate was charged and each vinyl acetate was added to it with stirring to emulsify the mixture. The autoclave was purged with nitrogen gas and ethylene monomer was fed from the top under a pressure in the case of a copolymerization of ethylene. In the examples, the partial pressure of ethylene was varied in a range of 20 to 150 kg/cm$^2$ at a polymerization temperature of 45° C. Then, a mixture of 2-methoxyethyl acrylate and 162 g. of glycidyl methacrylate and 1% aqueous solution of ammonium persulfate were respectively fed dropwise from different inlets during 8 to 16 hours and the polymerization was performed. A total amount of 2-methoxyethylacrylate and vinyl acetate was 10.8 kg. After the polymerization, a monomer was removed and the resulting emulsion of copolymer was coagulated with an aqueous solution of borax and the product was separated, dehydrated and dried on rolls to obtain the copolymer. The structures and yields of the copolymers are shown in Table 3.

Each copolymer was admixed with the following additives and the mixture was kneaded by 8 inch rolls at 50° C. and then, pressvulcanized to prepare a vulcanized sheet having 15 cm × 15 cm and a thickness of 2 mm. Physical properties of each sample were measured. The results are shown in Table 3.

| | |
|---|---|
| Copolymer | 100 wt. parts |
| Antioxidant (NOCRAC 224) | 1 wt. parts |
| Stearic acid | 1 wt. parts |
| Carbon HAF | 40 wt. parts |
| Tetraethylenepentamine | 1 wt. parts |

TABLE 3

| | Exp. 5 | Exp. 6 | Exp. 7 | Ref. 4 | Ref. 5 | Ref. 6 |
|---|---|---|---|---|---|---|
| Structure: (wt. part) | | | | | | |
| vinyl acetate comp. | 36 | 24 | 18 | 47 | 24 | 5 |
| 2-methoxyethyl acrylate comp. | 64 | 65 | 78 | 53 | 57 | 92 |
| ethylene comp. | 0 | 11 | 4 | 0 | 19 | 3 |
| glycidyl methacrylate comp. | 1.0 | 1.0 | 1.1 | 1.0 | 0.9 | 1.1 |
| Yield (kg.) | 9.9 | 10.3 | 10.1 | 9.8 | 10.3 | 9.5 |
| Physical property | | | | | | |
| $T_B$ (kg/cm$^2$) | 115 | 121 | 125 | 123 | 117 | 97 |
| $E_B$ (%) | 240 | 250 | 220 | 240 | 260 | 70 |
| Hs | 58 | 56 | 56 | 61 | 53 | 50 |
| Heat resistance | | | | | | |
| $A_R$ ($T_B$) (%) | 101 | 108 | 105 | 106 | 109 | 117 |
| $A_R$ ($E_B$) (%) | 63 | 67 | 61 | 68 | 65 | 55 |
| ΔHs | +8 | +7 | +8 | +6 | +8 | +13 |
| Oil resistance | | | | | | |
| ΔV (%) | 35 | 47 | 38 | 28 | 90 | 41 |
| Cold resistance | | | | | | |
| $T_b$ (°C.) | −15 | −31 | −30 | −5 | −36 | −35 |
| Ozone resistance | no crack | no crack | no crack | no crack | no crack | no crack |

EXAMPLES 8 to 11; REFERENCE 7

In a 40 liter autoclave, 16.2 kg. of an aqueous solution containing 530 g. of PVA, 21.6 g. of sodium acetate, 32.4 g. of Rongalit, 1.08 g. of ethylenediaminetetraacetic acid and 0.54 g. of ferrous sulfate was charged and 2.7 kg. of vinyl acetate was added to it with stirring to emulsify the mixture. The autoclave was purged with nitrogen gas and ethylene monomer was fed from the top under a pressure. The partial pressure of ethylene was adjusted to 50 kg/cm$^2$ at a polymerization temperature of 55° C. Then, a mixture of 8.1 kg. of 2-methoxyethyl acrylate and glycidyl methacrylate (an amount varied in a range of 60 to 900 g.) and 1% aqueous solution of ammonium persulfate were respectively fed dropwise from different inlets during 8 to 10 hours and the polymerization was performed. After the polymerization, a residual monomer was removed and the resulting emulsion of copolymer was coagulated with an aqueous solution of borax and the product was separated, dehydrated and dried on rolls to obtain the copolymer. The structures and yields of the copolymers are shown in Table 4. Each copolymer was admixed with the following additives and the mixture was kneaded by 8 inch rolls at 50° C. and then, press-vulcanized at 160° C. for 31 minutes and post-vulcanized at 150° C. for 15 hours in Geer's oven to prepare a vulcanized sheet having an area of 15 cm$^2$ and a thickness of 2 mm. Physical properties of each sample were measured. The results are shown in Table 4.

| Copolymer | 100 wt. parts |
|---|---|
| Antioxidant (NOCRAC NBC) | 1 wt. parts |
| Stearic acid | 1 wt. parts |
| Carbon SRF-LM | 60 wt. parts |
| Tetraethylenepentamine | 1.5 wt. parts |

TABLE 4

| | Exp. 8 | Exp. 9 | Exp. 10 | Exp. 11 | Ref. 7 |
|---|---|---|---|---|---|
| Structure: (wt. parts) | | | | | |
| vinyl acetate comp. | 23 | 21 | 22 | 21 | 20 |
| 2-methoxyethyl acrylate comp. | 70 | 73 | 70 | 72 | 74 |
| ethylene comp. | 7 | 6 | 8 | 7 | 6 |
| glycidyl methacrylate comp. | 0.4 | 0.7 | 1.6 | 4.2 | 6.1 |
| Yield (kg.) | 10.1 | 10.3 | 10.4 | 10.2 | 10.5 |
| Physical property | | | | | |
| $T_B$ (kg/cm$^2$) | 108 | 117 | 125 | 121 | 87 |
| $E_B$ (%) | 330 | 260 | 210 | 120 | 60 |
| Hs | 52 | 59 | 62 | 68 | 79 |

EXAMPLE 12

In a 40 liter autoclave, 16.2 kg. of an aqueous solution containing 530 g. of PVA, 21.6 g. of sodium acetate, 32.4 g. of Rongalit, 1.08 g. of ethylenediaminetetraacetic acid and 0.54 g. of ferrous sulfate was charged and 2.7 kg. of vinyl acetate was added to it with stirring to emulsify the mixture. The autoclave was purged with nitrogen gas and ethylene monomer was fed from the top under a pressure. The partial pressure of ethylene was adjusted to 55 kg/cm$^2$ at a polymerization temperature of 55° C. Then, a mixture of 8.1 kg. of 2-methoxyethyl acrylate and 216 g. of vinyl chloroacetate and 1% aqueous solution of ammonium persulfate were respectively fed dropwise from different inlets, during 10 hours and the polymerization was performed. After the polymerization, the residual monomer was removed and the resulting emulsion of copolymer was coagulated with an aqueous solution of borax and the product was separated, dehydrated and dried on rolls to obtain 10.2 kg. of the copolymer. The composition of the copolymer comprises 20 wt.parts of vinylacetate component, 73 wt.parts of 2-methoxyethyl acrylate, 7 wt.parts of ethylene and 1.3 wt.parts of vinyl chloroacetate.

Each copolymer was admixed with the following additives and the mixture was kneaded by 8 inch rolls at 50° C. and then, pressvulcanized at 170° C. for 30 minutes to prepare a vulcanized sheet having 15 cm × 15 cm and a thickness of 2 mm. Physical properties of the sample were measured. The results are shown in Table 5.

| Copolymer | 100 wt. parts |
| --- | --- |
| Antioxidant (NOCRAC 224) | 1 wt. part |
| Stearic Acid | 1 wt. part |
| Carbon SRF-LM | 60 wt. parts |
| Tetraethylenepentamine | 1 wt. part |

TABLE 5

| Physical property | Example 12 |
| --- | --- |
| $T_B$ (kg/cm$^2$) | 109 |
| $E_B$ (%) | 230 |
| Hs | 58 |
| Heat resistance | |
| $A_R$ ($T_B$) (%) | 110 |
| $A_R$ ($E_B$) (%) | 56 |
| ΔHs | +8 |
| Oil resistance | |
| ΔV (%) | 41 |
| Cold resistance | |
| $T_b$ (°C.) | −24 |

EXAMPLES 13 to 18

The copolymer obtained in Example 9 was admixed with the following additives and the mixture was kneaded by 8 inch rolls at 40° C. and vulcanized in the condition shown in Table 6 to prepare each vulcanized sheet having 15 cm × 15 cm and a thickness of 2 mm. Physical properties of each sample were measured. The results are shown in Table 7.

TABLE 7

| | Exp. 13 | Exp. 14 | Exp. 15 | Exp. 16 | Exp. 17 | Exp. 18 |
| --- | --- | --- | --- | --- | --- | --- |
| Composition: (wt. part) | | | | | | |
| Copolymer | 100 | 100 | 100 | 100 | 100 | 100 |
| Antioxidant (NOCRAC TNP) | | | 0.5 | 1 | | |
| Antioxidant (NOCRAC 224) | 1 | 1 | 1 | | 1 | 1 |
| Stearic acid | 1 | 1 | 1 | 1 | 1 | 1 |
| Carbon ISAF | 40 | | | | | 40 |
| Carbon FEF | | 80 | | | | |
| Carbon FT | | | | 60 | | |
| Calcium carbonate | | | | | 80 | |
| Hard clay | | | 80 | | | |
| Plasticizer | | | | | | 10 |
| Ammonium benzoate | | | | 1 | | |
| Hexamethylene diamine carbamate | | 1 | | | | |
| Triethylenetetramine | 1 | | 1 | | 1 | 1 |
| Diethyleneglycol | | | 2 | | | |
| Vulcanization condition: | | | | | | |
| Press-vulcanization: | | | | | | |
| Temperature (°C.) | 160 | 160 | 160 | 170 | 160 | 160 |
| Time (min.) | 30 | 30 | 30 | 30 | 30 | 30 |
| Post-vulcanization: | | | | | | |
| Temperature (°C.) | 150 | 150 | 150 | 150 | 150 | 150 |
| Time (min.) | 8 | 8 | 15 | 8 | 15 | 15 |

TABLE 7

| | Exp. 13 | Exp. 14 | Exp. 15 | Exp. 16 | Exp. 17 | Exp. 18 |
| --- | --- | --- | --- | --- | --- | --- |
| Physical property | | | | | | |
| $T_B$ (kg/cm$^2$) | 153 | 162 | 121 | 102 | 100 | 139 |
| $E_B$ (%) | 210 | 120 | 150 | 270 | 450 | 230 |
| Hs | 67 | 85 | 60 | 52 | 54 | 64 |
| Heat resistance | | | | | | |
| $A_R$ ($T_B$) (%) | 97 | 95 | 103 | 110 | 102 | 100 |
| $A_R$ ($E_B$) (%) | 80 | 77 | 71 | 63 | 67 | 78 |
| ΔHs | +4 | +3 | +5 | +6 | +8 | +2 |
| Oil resistance | | | | | | |
| ΔV (%) | 43 | 38 | 44 | 40 | 46 | 35 |
| Cold resistance | | | | | | |
| $T_b$ (°C.) | −25 | −13 | −22 | −23 | −21 | −33 |

EXAMPLE 19

In a 40 liter autoclave, 16.2 kg. of an aqueous solution containing 530 g. of PVA, 21.6 g. of sodium acetate, 32.4 g. of Rongalit, 1.08 g. of ethylenediaminetetraacetic acid and 0.54 g. of ferrous sulfate was charged and 5.4 kg. of vinyl acetate was added to it with stirring to emulsify the mixture. The autoclave was purged with nitrogen gas and ethylene monomer was fed from the top under a pressure. The partial pressure of ethylene was adjusted to 50 kg/cm$^2$ at a polymerization temperature of 55° C. Then, a mixture of 2.7 kg. of n-butyl acrylate, 2.7 kg. of 2-methoxyethyl acrylate and 1% aqueous solution of ammonium persulfate were respectively fed dropwise from different inlets during 8 to 10 hours and the polymerization was performed. After the polymerization, a residual monomer was removed and the resulting emulsion of copolymer was coagulated with 3% of aqueous solution of borax and the product was separated, dehydrated and dried on two rolls at 120° to 130° C. to obtain the polymer. The structures and yields of the copolymers are shown in Table 8.

The copolymer was admixed with the following additives and the mixture was kneaded by 8 inch rolls at 40° C. and press-vulcanized at 160° C. for 30 minutes to prepare a vulcanized sheet having 15 cm×15 cm and a thickness of 2 mm. Physical properties of each sample were measured. The results are shown in Table 8.

| | |
|---|---|
| Copolymer | 100 wt. parts |
| Antioxidant (NOCRAC 224) | 1 wt. parts |
| Stearic acid | 1 wt. parts |
| Carbon SRF-LM | 60 wt. parts |
| Dicumyl peroxide | 1.5 wt. parts |
| Triallyl cyanurate | 2.0 wt. parts |

EXAMPLES 20, 21; REFERENCES 8 to 11

In accordance with the process of Example 19, except varying ratio of monomers (10.8 kg. of total amount of vinylacetate, n-butyl acrylate, and 2-methoxyethyl acrylate) and varying the partial pressure of ethylene in a range of 30 to 70 kg/cm$^2$, the preparation and the measurement were repeated. The results are shown in Table 8.

TABLE 8

| | Exp. 19 | Exp. 20 | Exp. 21 | Ref. 8 | Ref. 9 | Ref. 10 | Ref. 11 |
|---|---|---|---|---|---|---|---|
| Structure: (wt. part) | | | | | | | |
| vinyl acetate comp. | 51 | 32 | 19 | 62 | 7 | 75 | 45 |
| n-butyl acrylate comp. | 19 | 28 | 37 | 15 | 41 | 8 | 43 |
| 2-methoxyethyl acrylate comp. | 23 | 31 | 38 | 17 | 44 | 0 | 0 |
| ethylene comp. | 7 | 9 | 6 | 6 | 8 | 17 | 12 |
| Yield (kg.) | 10.4 | 10.6 | 10.3 | 10.8 | 9.9 | 10.9 | 10.3 |
| Physical property*1 | | | | | | | |
| $T_B$ (kg/cm$^2$) | 120 | 113 | 103 | 118 | 50 | 132 | 101 |
| $E_B$ (%) | 220 | 240 | 250 | 230 | 310 | 210 | 320 |
| Hs | 60 | 58 | 52 | 65 | 51 | 87 | 68 |
| Heat resistance*2 | | | | | | | |
| $A_R (T_B)$ (%) | 107 | 102 | 111 | 109 | 115 | 98 | 104 |
| $A_R (E_B)$ (%) | 60 | 62 | 61 | 67 | 47 | 65 | 72 |
| ΔHs | +9 | +7 | +9 | +7 | +15 | +6 | +10 |
| Oil resistance*3 | | | | | | | |
| ΔV (%) | 23 | 24 | 26 | 18 | 29 | 25 | 47 |
| Cold resistance*4 | | | | | | | |
| $T_b$ (°C.) | −11 | −25 | −35 | +1 | −40 | 0 | −20 |

TABLE 9

| | Exp. 22 | Exp. 23 | Exp. 24 | Ref. 12 |
|---|---|---|---|---|
| Structure: (wt. part) | | | | |
| vinyl acetate comp. | 41 | 37 | 23 | 22 |
| n-butyl acrylate comp. | 8 | 17 | 32 | 36 |
| 2-methoxyethyl acrylate comp. | 35 | 28 | 28 | 24 |
| ethylene comp. | 16 | 18 | 17 | 18 |
| glycidyl methacrylate comp. | 1.0 | 1.1 | 1.0 | 0.9 |
| Yield (kg.) | 10.8 | 10.6 | 10.4 | 10.3 |
| Physical property | | | | |
| $T_B$ (kg/cm$^2$) | 123 | 131 | 113 | 115 |
| $E_B$ (%) | 200 | 230 | 250 | 240 |
| Hs | 66 | 67 | 67 | 68 |
| Heat resistance | | | | |
| $A_R (T_B)$ (%) | 115 | 110 | 121 | 114 |
| $A_R (E_B)$ (%) | 58 | 62 | 61 | 55 |
| ΔHs | +8 | +9 | +9 | +7 |
| Oil resistance | | | | |
| ΔV (%) | 20 | 26 | 30 | 41 |
| Cold resistance | | | | |
| $T_b$ (°C.) | −26 | −27 | −37 | −39 |

EXAMPLES 22 to 24; REFERENCE 12

In a 40 liter autoclave, 16.2 kg. of an aqueous solution containing 530 g. of sodium dodecylbenzenesulfonate, 21.6 g. of sodium acetate, 32.4 g. of Rongalit, 1.08 g. of ethylenediaminetetraacetic acid and 0.54 g. of ferrous sulfate was charged and vinyl acetate was added to it with stirring to emulsify the mixture. The autoclave was purged with nitrogen gas and ethylene monomer was fed from the top under a pressure. The partial pressure of ethylene was varied in a range of 60 to 150 kg/cm$^2$ at a polymerization temperature of 45° C. in the examples. Then, a mixture of n-butyl acrylate, 2-methoxyethyl acrylate and 162 g. of glycidyl methacrylate and 1% aqueous solution of ammonium persulfate were respectively fed dropwise from different inlets, during 8 to 12 hours and the polymerization was performed. A total of vinyl acetate, n-butyl acrylate and 2-methoxyethyl acrylate was 10.8 kg. but the ratios of the monomers were varied in the examples. In accordance with the process of Example 2 the physical properties of the vulcanized sheet obtained by using the resulting copolymer were measured. The results are shown in Table 9.

EXAMPLES 25, 26; REFERENCE 13, 14

In a 40 liter autoclave, 16.2 kg. of an aqueous solution containing 530 g. of PVA, 21.6 g. of sodium acetate, 32.4 g. of Rongalit, 108 g. of ethylenediaminetetraacetic acid and 0.54 g. of ferrous sulfate was charged and vinyl acetate was added to it with stirring to emulsify the mixture. The autoclave was purged with nitrogen gas and ethylene monomer was fed from the top under a pressure. The partial pressure of ethylene was varied in a range of 30 to 150 kg/cm$^2$ at a polymerization temperature of 45° C. in the examples. Then, a mixture of n-butyl acrylate, 2-methoxyethyl acrylate and 162 g. of glycidyl methacrylate and 1% aqueous solution of ammonium persulfate were respectively fed dropwise from different inlets, during 8 to 12 hours and the polymerization was performed. A total of vinyl acetate, n-butyl acrylate and 2-methoxyethyl acrylate was 10.8 kg. but the ratios of the monomers were varied in the examples.

After the polymerization, a residual monomer was removed and the resulting emulsion of copolymer was coagulated with an aqueous solution of borax and the product was separated, dehydrated and dried on rolls to obtain the copolymer. The structures and yields of the copolymers are shown in Table 10. Each copolymer was admixed with the following additives and the mixture was kneaded by 8 inch rolls at 40° C. and then, press-vulcanized at 170° C. for 30 minutes and post-vulcanized at 150° C. for 8 hours in Geer's oven to prepare a vulcanized sheet having 15 cm × 15 cm and a thickness of 2 mm. Physical properties of each sample were measured. The results are shown in Table 10.

| Copolymer | 100 wt. parts |
|---|---|
| Antioxidant (NOCRAC TNP) | 1 wt. parts |
| Stearic acid | 1 wt. parts |
| Carbon FEF | 1 wt. parts |
| Ammonium benzoate | 1 wt. parts |

TABLE 10

| | Exp. 25 | Exp. 26 | Ref. 13 | Ref. 14 |
|---|---|---|---|---|
| Structure: (wt. part) | | | | |
| vinyl acetate comp. | 53 | 21 | 53 | 32 |
| n-butyl acrylate comp. | 20 | 30 | 19 | 23 |
| 2-methoxyethyl acrylate comp. | 17 | 32 | 26 | 19 |
| ethylene comp. | 10 | 17 | 2 | 26 |
| glycidyl methacrylate comp. | 0.9 | 0.9 | 1.1 | 1.0 |
| Yield (kg.) | 10.5 | 11.1 | 10.0 | 11.3 |
| Physical property | | | | |
| $T_B$ (kg/cm$^2$) | 129 | 115 | 124 | 108 |
| $E_B$ (%) | 190 | 200 | 180 | 210 |
| Hs | 68 | 61 | 75 | 58 |
| Heat resistance | | | | |
| $A_R$ ($T_B$) (%) | 103 | 100 | 109 | 111 |
| $A_R$ ($E_B$) (%) | 87 | 83 | 90 | 85 |
| $\Delta$Hs | +2 | +2 | +2 | +4 |
| Oil resistance | | | | |
| $\Delta V$ (%) | 21 | 28 | 13 | 43 |
| Cold resistance | | | | |
| $T_b$ (°C.) | −11 | −39 | −4 | −38 |

EXAMPLES 27, 28; REFERENCE 15

In accordance with the process of Example 25 except feeding ethylene under a partial pressure of 50 kg/cm$^2$ at a polymerization temperature of 55° C. and varying the ratios of vinyl acetate, n-butyl acrylate, 2-methoxyethyl acrylate, ethylene and glycidyl methacrylate, each copolymer was produced, and each vulcanized sheet was prepared by admixing the copolymer with the following additives and physical properties were measured. The results are shown in Table 11.

| Copolymer | 100 wt. parts |
|---|---|
| Antioxidant (NOCRAC NS-6) | 1 wt. parts |
| Stearic acid | 1 wt. parts |
| Carbon SRF-LM | 60 wt. parts |
| Plasticizer (Emulgen 109P manufactured by Kao Soap) | 7 wt. parts |
| Hexamethylene diamine-carbamate | 1 wt. parts |

TABLE 11

| | Exp. 27 | Exp. 28 | Ref. 15 |
|---|---|---|---|
| Structure: (wt. part) | | | |
| vinyl acetate comp. | 45 | 49 | 44 |
| n-butyl acrylate comp. | 22 | 17 | 21 |
| 2-methoxyethyl acrylate comp. | 24 | 21 | 25 |
| ethylene comp. | 9 | 13 | 10 |
| glycidyl methacrylate comp. | 0.7 | 4.1 | 5.7 |
| Yield (kg.) | 10.7 | 10.6 | 10.9 |
| Physical property | | | |
| $T_B$ (kg/cm$^2$) | 102 | 113 | 130 |
| $E_B$ (%) | 260 | 160 | 75 |
| Hs | 57 | 72 | 79 |
| Oil resistance | | | |
| $\Delta V$ (%) | 20 | 21 | 19 |
| Cold resistance | | | |
| $T_b$ (°C.) | −17 | −16 | −18 |

EXAMPLES 29 to 31; REFERENCE 16

In a 40 liter autoclave, 16.2 kg. of each aqueous solution containing 530 g. of PVA, 21.6 g. of sodium acetate, 34.2 g. of Rongalit, 1.08 g. of ethylenediaminetetraacetic acid and 0.54 g. of ferrous sulfate was charged and 5.4 kg. of each vinyl carboxylate was added to it with stirring to emulsify the mixture. The autoclave was purged with nitrogen gas and ethylene monomer was fed from the top under the pressure. The pressure of ethylene was adjusted to 50 kg/cm$^2$ at 45° C. Then, a mixture of 2.7 kg. of n-butyl acrylate, 2.7 kg. of 2-methoxyethyl acrylate and 162 g. of glycidylmethacrylate and 1% aqueous solution of ammonium persulfate were respectively fed dropwise from different inlets during 8 to 10 hours and the polymerization was performed. After the polymerization, the residual monomer was removed and the resulting emulsion of copolymer was coagulated with an aqueous solution of borax and the product was separated, dehydrated and dried on rolls to obtain the copolymer. The structure and yields of the copolymers are shown in Table 2.

Each copolymer was admixed with the following additives and the mixture was kneaded by 8 inch rolls at 50° C. and then, press-vulcanized at 160° C. for 30 minutes to prepare a vulcanized sheet having 15 cm × 15 cm and a thickness of 2 mm. Physical properties of each sample were measured. The results are shown in Table 12.

| Copolymer | 100 wt. parts. |
|---|---|
| Antioxidant (NOCRAC 224) | 1 wt. parts. |
| Stearic acid | 1 wt. parts. |
| Carbon HAF | 40 wt. parts. |
| Tetraethylene pentamine | 1 wt. parts. |

TABLE 12

| | Exp. 29 vinyl acetate | Exp. 30 vinyl propionate | Exp. 31 vinyl acetate | Ref. 16 vinyl caproate |
|---|---|---|---|---|
| Type of vinyl carboxylate | | | | |
| Structure: (wt. part) | | | | |
| vinyl carboxylate comp. | 30 | 30 | 29 | 27 |
| n-butyl acrylate comp. | 28 | 27 | 28 | 27 |
| 2-methoxyethyl | 33 | 34 | 35 | 38 |

TABLE 12-continued

| Type of vinyl carboxylate | Exp. 29 vinyl acetate | Exp. 30 vinyl propionate | Exp. 31 vinyl acetate | Ref. 16 vinyl caproate |
|---|---|---|---|---|
| acrylate comp. | | | | |
| ethylene comp. | 9 | 7 | 8 | 8 |
| glycidyl methacrylate comp. | 0.9 | 0.9 | 1.0 | 0.9 |
| Yield (kg.) | 10.5 | 9.9 | 10.1 | 9.7 |
| Physical property | | | | |
| $T_B$ (kg/cm$^2$) | 132 | 115 | 98 | 72 |
| $E_B$ (%) | 190 | 210 | 250 | 300 |
| Hs | 62 | 59 | 53 | 47 |
| Heat resistance | | | | |
| $A_R$ ($T_B$) (%) | 105 | 107 | 112 | 119 |
| $A_R$ ($E_B$) (%) | 63 | 60 | 59 | 53 |
| $\Delta$Hs | +7 | +8 | +11 | +14 |
| Oil resistance | | | | |
| $\Delta V$ (%) | 25 | 27 | 30 | 42 |
| Cold resistance | | | | |
| $T_b$ (°C.) | −26 | −38 | −42 | −49 |

EXAMPLE 32

In a 40 liter autoclave, 16.2 kg. of an aqueous solution containing 530 g. of PVA, 21.6 g. of sodium acetate, 32.4 g. of Rongalit, 1.08 g. of ethylenediaminetetraacetic acid and 0.54 g. of ferrous sulfate was charged and then, 5.4 kg. of vinyl acetate was added with stirring to emulsify the mixture. The autoclave was purged with nitrogen gas and ethylene monomer was fed from the top under a pressure. The partial pressure of ethylene was adjusted to 50 kg./cm$^2$ at a polymerization temperature of 45° C. Then, a mixture of 2.7 kg of 2-ethylhexyl acrylate and 2.7 kg. of 2-methoxyethyl acrylate and 216 g. of vinyl chloroacetate, and 1% aqueous solution of ammonium persulfate were respectively fed dropwise from different inlets during 8 to 10 hours and the polymerization was performed. After the polymerization, a residual monomer was removed and the resulting emulsion of copolymer was coagulated with 3% aqueous solution of borax and the product was separated, dehydrated and dried on rolls to obtain the copolymer. The structure of the copolymer is shown in Table 13. The yield was 10.7 kg.

The copolymer was admixed with the following additives and the mixture was kneaded by 8 inch rolls at 50° C. and then, press-vulcanized at 160° C. for 30 minutes to prepare a vulcanized sheet having 15 cm × 15 cm and a thickness of 2 mm. Physical properties of the sample were measured. The results are shown in Table 13.

TABLE 13

| | Example 32 |
|---|---|
| Structure: (wt. part) | |
| vinyl acetate comp. | 43 |
| 2-ethylhexyl acrylate comp. | 21 |
| 2-methoxyethyl acrylate comp. | 24 |
| ethylene comp. | 12 |
| vinyl chloroacetate comp. | 1.4 |
| Additive: (wt. part) | |
| Copolymer | 100 |
| Antioxidant (NOCRAC 224) | 1 |
| Stearic acid | 1 |
| Carbon FEF | 20 |
| Calcium carbonate | 60 |
| Triethylenetetraamine | 1 |
| Physical property | |
| $T_B$ (kg./cm$^2$) | 111 |
| $E_B$ (%) | 420 |
| Hs | 57 |
| Heat resistance | |
| $A_R$ ($T_B$) (%) | 98 |
| $A_R$ ($E_B$) (%) | 83 |
| $\Delta$Hs | +3 |
| Oil resistance | |
| $\Delta V$ (%) | 30 |
| Cold resistance | |
| $T_b$ (°C.) | −20 |

We claim:

1. A rubbery polymer composition consisting essentially of a crosslinkable copolymer of Type II:

Type II 15 to 55 wt. parts of a vinyl carboxylate having the formula (I); 5 to 20 wt. parts of ethylene; an alkyl acrylate having the formula (II'); an alkoxyalkyl acrylate having the formula (II) (100 wt. parts of a total of said four components and more than 0.8 of a ratio of the alkoxyalkyl acrylate (II) to the alkyl acrylate (II') by weight); 0 to 5 wt. parts of the components having the formula (III), (IV) or (V):

(I): RCOO-CH=CH$_2$
wherein R represents a C$_{1-4}$ alkyl group (II): CH$_2$=CHCOO—R$_1$O—R$_2$
  wherein R$_1$ represents a C$_{1-4}$ alkylene group; and R$_2$ represents a C$_{1-4}$ alkyl or alkoxyalkyl group (II'): CH$_2$=CHCOO—R$_6$
  wherein R$_6$ represents a C$_{3-8}$ alkyl group

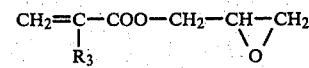

(III)

wherein R$_3$ represents hydrogen atom or methyl group

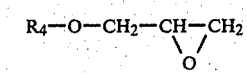

(IV)

wherein R$_4$ represents vinyl, allyl or methallyl group (V): CH$_2$=CH—O—R$_5$ wherein $R_5$ represents $CH_2Cl-CH_2-$ or $CH_2Cl-CO-$ group.

2. A rubbery polymer composition according to claim 1 wherein a crosslinking agent is incorporated at a ratio of 0.3 to 10 wt.% based on said copolymer.

3. A rubbery polymer composition according to claim 2 wherein said crosslinking agent is a peroxide type crosslinking agent or an epoxide ring cleavage agent.

4. A rubbery polymer composition according to claim 1 wherein a reinforcing agent is incorporated at a ratio of 10 to 200 wt.% based on said copolymer.

5. A rubbery polymer composition according to claim 4 wherein said reinforcing agent is carbon, silicic acid, clay, calcium, carbonate or talc.

6. A rubbery polymer composition according to claim 1 wherein an antioxidant is incorporated.

7. A rubbery polymer composition according to claim 1 further containing suitable additives wherein the additives are incorporated into the composition by the wet master batch method.

8. A rubbery polymer composition according to claim 3 wherein another rubbery polymer selected from the group consisting of EPDM rubber, NBR rubber, chloroprene rubber, natural rubber, SB rubber, butadiene rubber, butyl rubber and isoprene rubber is blended to said copolymer.

* * * * *